United States Patent [19]

Hayashi et al.

[11] Patent Number: 5,749,384

[45] Date of Patent: May 12, 1998

[54] METHOD AND APPARATUS FOR PERFORMING PREVENTIVE MAINTENANCE ON THE BOTTOM PORTION OF A REACTOR PRESSURE VESSEL USING CAVITATION BUBBLES

[75] Inventors: Eisaku Hayashi; Koichi Kurosawa, both of Hitachi; Fujio Yoshikubo, Mito; Hideyasu Furukawa; Ren Morinaka, both of Hitachi; Kunio Enomoto, Tokai-mura; Masahiro Otaka, Hitachi; Noboru Chiba, Tokai-mura; Kazunori Sato, Kure, all of Japan

[73] Assignees: Hitachi, Ltd.; Babcock-Hitachi Kabushiki Kaisha, both of Tokyo; Hitachi Nuclear Engineering Co., Ltd.; Hitachi Kiso Co., Ltd., both of Ibaraki, all of Japan

[21] Appl. No.: 409,689

[22] Filed: Mar. 24, 1995

[30] Foreign Application Priority Data

Mar. 31, 1994 [JP] Japan ................. 6-062408

[51] Int. Cl.$^6$ ................................ B08B 9/02
[52] U.S. Cl. ............. 134/167 R; 134/181; 134/172; 134/24
[58] Field of Search .............. 134/167 R, 168 R, 134/172, 180, 181, 198, 221, 24

[56] References Cited

U.S. PATENT DOCUMENTS

| | | | |
|---|---|---|---|
| 3,595,256 | 7/1971 | Waltman | 134/167 R |
| 3,985,572 | 10/1976 | Peterman et al. | 134/167 R |
| 4,163,455 | 8/1979 | Herbert et al. | 134/167 R |
| 4,470,952 | 9/1984 | Vassalotti | 134/167 R |
| 4,691,723 | 9/1987 | Mierswa et al. | 134/172 |
| 4,827,953 | 5/1989 | Lee | 134/172 |
| 4,980,120 | 12/1990 | Bowman et al. | 134/172 |
| 5,020,183 | 6/1991 | Grant, Jr. | 134/167 R |
| 5,036,871 | 8/1991 | Ruggieri et al. | 134/167 R |
| 5,080,720 | 1/1992 | Titmas | 134/180 |

OTHER PUBLICATIONS 23,820, Feb. 1981 EPX.

*Primary Examiner*—Frankie L. Stinson
*Attorney, Agent, or Firm*—Antonelli, Terry, Stout & Kraus, LLP

[57] ABSTRACT

An apparatus preventive maintenance having a driving mechanism capable of driving a jet nozzle 24 to cause it to travel upward-and-downward, to rotate and to swing is settled on the top of a housing in the bottom portion of a reactor pressure vessel and on a hole for a fuel support piece, water pumped by a high pressure pump is spouted from a jet nozzle, and cavitation bubbles generated during the spouting are supplied to the positions to be treated for preventive maintenance, such as housings in the bottom portion of the reactor pressure vessel. Therewith, the residual tensile stress in the position to be treated is improved in a releasing direction by the energy generated by the collapsing of the cavitation bubbles.

14 Claims, 9 Drawing Sheets

RELEASED REMAINING STRESS
(AFTER EXECUTION − BEFORE EXECUTION)

| NO. | EXECUTING PATTERN | NUMBER OF EXECUTED CRD HOUSINGS PER ONE INSTALLED POSITION OF THE APPARATUS |
|---|---|---|
| 1 |  | 1.0 |
| 2 |  | 1.25 |
| 3 |  | 1.5 |
| 4 |  | 1.75 |
| 5 |  | 2.0 |
| 6 |  | ICM 0.5 |

METHOD AND APPARATUS FOR PERFORMING PREVENTIVE MAINTENANCE ON THE BOTTOM PORTION OF A REACTOR PRESSURE VESSEL USING CAVITATION BUBBLES

BACKGROUND OF THE INVENTION

The present invention relates to a preventive maintenance apparatus for preventing occurrence of stress corrosion cracking (SCC) by decreasing residual tensile stress existing in a metallic material through the spouting of a liquid jet at a metallic member, and more particularly relates to a technology suitable for a preventive maintenance apparatus capable of attaining relaxation and a decrease in residual tensile stress existing in a structural member in the bottom portion of a reactor pressure vessel, such as an overlaid portion in a bottom head of a reactor pressure vessel, a welded portion between the bottom of the reactor pressure vessel and a control rod drive system (hereinafter referred to as CRD) stub tube or an incore monitoring system (hereinafter referred to as ICM) housing, and welding heat affected zones of these portions in a boiling water reactor (BWR) plant already in service.

The technologies for preventive maintenance of this type are described in the following publications, for example 1;

(1) JP A 52-130409 (1977), (2) JP A 4-362124 (1992), (3) JP A 5-78738 (1993), (4) JP A 5-195052 (1993), (5) JP A 6-47668 (1994), and (6) JP A 6-71564 (1994).

In the above referenced publication (1), a relaxation method for residual stress in a welded portion of a pipe having a common single cylindrical structure is described.

The summary of the description in this publication is that a welded portion of a pipe is rapidly heated with a heating coil provided on the outer surface of the welded portion of the pipe while the inside of the pipe is being cooled with flowing water.

The heating generates a temperature distribution necessary for improving the condition of residual stress inside the plate of the pipe to cause tensile yield on the inner surface of the welded portion of the pipe and a retained compressive stress when the pipe is cooled.

This technique is very effective for relaxation of residual stress in a welded portion of a pipe having a single cylindrical structure.

However, because the technique seeks to relax the residual stress in the inner surface of a pipe, it is difficult to apply the technology, as it is, to a CRD stub tube, a CRD housing, an ICM housing or a welded portion in the bottom portion of a reactor pressure vessel, because the CRD stub tube and the CRD housing are of a partially double tube structure and quite a large amount of heat energy seems to be required to cause tensile yield in the bottom portion of the reactor pressure vessel.

In addition to this, there are a large number of CRD stud tubes, CRD housings and ICM housings which are the objects of preventive maintenance for example, 102 to 240 of these member may be present depending on the output capacity of the nuclear plant. Therefore, it takes a long time and is inefficient to operate on them one-by-one.

The above referenced publication (2) corresponds to U.S. application Ser. No. 07/894960. In the publication, an apparatus for preventive maintenance is described. The apparatus is designed to prevent occurrence of a stress corrosion crack (SCC) by improving the condition of residual tensile stress existing in a metallic material through colliding cavitation bubbles generated by spouting a liquid jet onto the metallic material.

However, the apparatus does not have any means to settle the apparatus to a structure in the bottom portion of a reactor pressure vessel where a lot of CRD stub tubes, ICM housings and CRD housings closely stand together. Therefore, it is not suitable for the work of preventive maintenance for the structure in the bottom portion of a reactor pressure vessel.

The above referenced publication (3) discloses an apparatus for preventive maintenance to prevent occurrence of a stress corrosion crack (SCC) in which a nozzle for spouting a liquid jet is attached to the end of a lower mast, the lower mast is rotatably attached to an upper mast, and the upper mast is suspended from the top of a reactor pressure vessel to be supported. In performing preventive maintenance work, the nozzle is rotated so as to become horizontal, if necessary, and to be directed toward a shroud in the reactor pressure vessel, and a liquid jet is spouted from the nozzle against the shroud to improve the condition of residual tensile stress existing in the shroud by discharging cavitation bubbles generated by the jet.

However, the apparatus is not suitable for preventive maintenance work for the structure in the bottom portion of a reactor pressure vessel because the lower end portion of the apparatus is apt to swing when the apparatus is extended up to the bottom of the reactor pressure vessel since the apparatus is suspended from the top end of the reactor pressure vessel and does not have any means to fix it to the structure in the bottom portion of the reactor pressure vessel where a large number of CRD stub tubes, ICM housings and CRD housings closely stand together.

The above referenced publication (4) discloses an apparatus for preventive maintenance to prevent occurrence of a stress corrosion crack (SCC) in which a nozzle for spouting a liquid jet and a guide roller rotatably moving along the inside of a shroud are attached to the end of a lower mast, the lower mast is rotatably attached to an upper mast, and the upper mast is suspended from the top of a reactor pressure vessel to be supported. In performing preventive maintenance work, the nozzle is rotated so as to become horizontal, if necessary, and to be a shroud in the reactor pressure vessel, and a liquid jet is spouted from the nozzle against the shroud to improve the condition of residual tensile stress existing in the shroud by discharging cavitation bubbles generated by the jet. The publication also discloses an apparatus having a mechanism to change the direction of the nozzle by rotating the nozzle between the vertical and the horizontal directions using a link mechanism and mounting a CCD camera for observing the position of the preventive maintenance work.

However, the apparatus is not suitable for preventive maintenance work for the structure in the bottom portion of a reactor pressure vessel because the lower end portion of the apparatus is apt to swing when the apparatus is extended up to the bottom of the reactor pressure vessel when it is used in the reactor pressure vessel since the apparatus is suspended from the top end of the reactor pressure vessel and does not have any means to fix it to the structure in the bottom portion of the reactor pressure vessel where a large number of CRD stub tubes, ICM housings and CRD housings closely stand together.

The above referenced publication (5) discloses an apparatus for preventive maintenance to prevent occurrence of a stress corrosion crack (SCC) in which a nozzle inserted in a container containing liquid suspended from the top of the container using a manipulator, and a liquid jet is spouted from the nozzle against a surface to be treated to improve the condition of residual tensile stress existing in the surface by discharging cavitation bubbles generated by the jet. And, the publication also discloses that the executing efficiency of the apparatus can be improved by properly controlling the distance between the nozzle and the surface to be treated or the jet pressure of the nozzle.

However, the apparatus is not suitable for preventive maintenance work for the structure in the bottom portion of a reactor pressure vessel because the lower end portion of the apparatus is apt to swing when the apparatus is extended up to the bottom of the reactor pressure vessel when it is used in the reactor pressure vessel since the apparatus is suspended from the top end of the container and does not have any means to fix it to the structure in the bottom portion of the reactor pressure vessel where a large number of CRD stub tubes, ICM housings and CRD housings closely stand together.

The above referenced publication (6) discloses an apparatus for preventive maintenance to prevent occurrence of a stress corrosion crack (SCC) in which there are provided a nozzle spouting a high speed jet flow and a low speed jet nozzle spouting a low speed jet flow against a surface to be treated and a suction port in a corner existing in a comparably lower portion of a container containing liquid, the apparatus having a mechanism to support the nozzle, the low speed jet nozzle and the suction port and a television camera at the same time with a nozzle support. Crud on the surface to be treated is detached and suspended by the low speed flow spouted from the low speed jet nozzle and then is sucked and removed by the suction port to prevent the crud from floating and diffusing and to improve positioning of the apparatus against the surface to be executed by improving the visibility of the television camera. Then a high speed jet flow of liquid is spouted from the nozzle against the surface to be treated which has been cleaned by removing the crud, cavitation bubbles generated by the jet being discharged to the surface to improve the condition of the residual tensile stress existing in the surface.

However, the apparatus is not suitable for preventive maintenance work for the structure in the bottom portion of a reactor pressure vessel because the apparatus does not have any means to fix it to the structure in the bottom portion of the reactor pressure vessel where a large number of CRD stub tubes, ICM housings and CRD housings closely stand together.

Therefore, the conventional apparatuses have neither the capability to perform preventive maintenance for a large number of CRD stud tubes, ICM housings and CRD housings, nor provide any means or any method for preventive maintenance suitable for the structure in the bottom portion of a reactor pressure vessel.

In a plant constructed in the early stage of commercial use of nuclear generated power, materials used were stainless steel containing a relatively high carbon content for CRD housings and an ICM housing and a nickel base alloy for CRD stub tubes, which become to have a high sensitivity against a stress corrosion crack (SCC) due to welding heat (referred to as sensitization). The potential of occurrence of a stress corrosion crack, which is to be solved by the present invention, is increased by the sensitization described above, with in combination with tensile stress and a corrosion environment. The number of the portions to be treated to prevent occurrence of a stress corrosion crack, which is to be solved by the present invention, is 102 to 240 depending on the capacity of the output power of the nuclear power plant. It is time-consuming and inefficient to treat the portions one-by-one, which seems to have a strong impact on the normal scheduled inspection period of a nuclear power plant.

SUMMARY OF THE INVENTION

The first object of the present invention is to provide an apparatus for preventive maintenance capable of improving the condition of residual stress in the bottom portion of a reactor pressure vessel having CRD stub tubes, CRD housings and an ICM housing and for efficiently treating the large number of portions to be treated. The second object of the present invention is to provide a method thereof.

To attain the first object described above, there is provided an apparatus for preventive maintenance of the bottom portion of a reactor pressure vessel to improve a stress condition in an internal structure in a reactor pressure vessel by spouting a high pressure jet accompanying generation of cavitation bubbles from a jet with nozzle toward the internal structure under water in the reactor pressure vessel, which comprises a fixed structural body fixed to a CRD housing in the reactor pressure vessel, and a rotating body mounted on the fixed structural body with the capability of rotating in the horizontal plane, an articulated arm mounted on the rotation body with the capability of swinging on a plane having an angle with the rotating plane of the rotating body, and a jet nozzle supported by the articulated arm. Preferably the jet nozzle is mounted on the articulated arm in such a position that the center of the jet stream of the jet nozzle is eccentric with respect to the center of the CRD housing. Moreover, the jet nozzle maybe an eccentric nozzle in which the position of mounting thereof on the articulated arm and the center of the jet stream of the jet nozzle are eccentric in the horizontal direction. As a further feature, the articulated arm comprises means for exchanging and mounting a jet nozzle having the center of its jet stream eccentric to the CRD housing and a jet nozzle having the center of its jet stream not eccentric. In various arrangements, it is for the rotating body to support the articulated arm with the capability of moving upward and downward. There also may be provided a member engaged with a positioning pin secured and supported to a core support plate. It is also possible to provide a monitoring camera for observing an object to be treated with preventive maintenance. In the various arrangements, a suction port of a sucking unit may be installed outside the reactor pressure vessel near an object to be treated with preventive maintenance. Further, a gas collecting cover communicating with an exhausting duct maybe installed outside the reactor pressure vessel is provided near the water surface of the reactor water. To attain the second object described above there is provided a method of preventive maintenance for the bottom portion of a reactor pressure vessel to improve a stress condition in an object to be treated with preventive maintenance by causing cavitation bubbles generated by spouting water from a jet nozzle provided in an apparatus for preventive maintenance installed in a reactor pressure vessel to be directed toward the object to be treated so as to collide therewith, wherein reactor water is retained in the reactor pressure vessel, the apparatus for preventive maintenance being engaged with a core support plate and a CRD housing in the reactor pressure vessel so as to be fixed in the reactor pressure vessel, and cavitation bubbles generated by spouting water from the jet nozzle mounted on the apparatus are cause to collide with the CRD housing and CRD housings around the CRD housing and with another desired portion to be treated by changing the posture of the jet nozzle and by moving its position in three dimensional directions. Preferably, the region of the object to be treated with preventive maintenance is changed through changing the effect of the movement of the cavitation bubbles around the object by making the center of the jet stream of the jet nozzle eccentric to the center of the CRD housing.

By setting the apparatus for preventive maintenance in one setting position, a high pressure water jet from a jet nozzle can be directed against a plurality of objects to be treated with preventive maintenance by rotating the rotating body and by swinging the articulated arm to the structure body fixed to a CRD housing, and the generated cavitation bubbles can be made to collide with plural objects to be treated in order to improve the stress condition in the plural objects. Therefore, by setting an apparatus for preventive maintenance in one setting position, it is possible to improve the stress condition of plural objects in the bottom portion of a reactor pressure vessel where various kinds of housings closely stand together, and thereby it is possible to obtain an effect in that preventive maintenance in the bottom portion of the reactor pressure vessel can be easily and speedily performed.

According to the invention, it is possible to expand the region to be treated in the direction opposite to the direction of the jet nozzle due to movement of cavitation bubbles along the CRD housing due to the eccentricity of the center of jet stream of the jet nozzle with respect to the center of the CRD housing axis. Therefore, in addition to the effects described above, it is possible to obtain an effect in that the directional range of the stress improved region is expanded due to the effect of the cavitation bubbles tending to follow a curved surface with which they come into contact (hereinafter referred to as the "movement effect" of the cavitation bubbles).

By making the attaching position of the jet nozzle to the articulated arm eccentric to the center of the jet stream of said jet nozzle in the horizontal direction, in addition to the effects described above, it is possible to obtain an effect in that the directional range of stress of the improved region is expanded due to the movement effect of the cavitation bubbles more easily due to the manner of attaching the jet nozzle to the articulated arm.

According to the invention, it is possible to perform different operations in the region of the preventive maintenance by exchanging the jet nozzles. Therefore, in addition to the effects described above, it is possible to obtain an effect in that the directional range of the stress improved region is expanded due to the movement effect of cavitation bubbles more easily by exchanging the jet nozzles.

According to the invention, it is possible to expand the region of preventive maintenance in the upward and downward directions by shifting the position of the articulated arm. Therefore, in addition to the effects described above, it is possible to expand the region of preventive maintenance in the upward and downward directions.

According to the invention, it is possible for the target position of jetting by the jet nozzle to be accurate, since the apparatus for preventive maintenance of the bottom portion of a reactor pressure vessel is stably supported with multi-points by engaging with the side of the core support plate in addition to the CRD housing. Therefore, in addition to the above-described effects, it is possible to perform accurate preventive maintenance work by stably setting the apparatus with respect to the bottom portion of the reactor pressure vessel.

According to the invention, it is possible to visually understand the feature of the preventive maintenance work with use of a monitoring camera. Therefore, in addition to the effects described above, it is possible to understand the feature of the preventive maintenance work.

According to the invention, it is possible to prevent radioactive contamination from expanding up to the top water surface of the reactor water by preventing activated crud from freely floating upward from the bottom portion of the reactor pressure vessel to the water surface of the reactor water by sucking the activated crud, which has been dislodged from the bottom portion of the reactor pressure vessel by the jet energy from the jet nozzle, using a suction unit. Therefore, in addition to the effects described above, it is possible to prevent radioactive contamination with the activated crud.

According to the invention, it is possible to prevent radioactive contamination from the water surface of the reactor water by collecting floating-up gas formed on the water surface of the reactor water by floating-up bubbles generated in the bottom portion of the reactor pressure vessel through the preventive maintenance work and by exhausting the gas through an exhaust gas duct. Therefore, in addition to the effects described above, it is possible to prevent radioactive contamination above the water surface of the reactor water due to the bubbles generated by the preventive maintenance work.

According to the invention, it is possible, by setting the apparatus for preventive maintenance in a space in the bottom portion of the reactor pressure vessel by engaging with the core support plate and the CRD housing, for the preventive maintenance work to be applied to plural CRD housings, including the CRD housing used for setting the apparatus, and other desired portions to be treated with preventive maintenance by changing the posture of the jet nozzle and by moving the position of the jet nozzle in three dimensional directions without changing the setting position of the apparatus. Therefore, by accurately and stability setting the apparatus for preventive maintenance in the bottom portion of the reactor pressure vessel, it is possible for the preventive maintenance to be easily and speedily applied to the CRD housing used for setting the apparatus and the desired portions to be treated with preventive maintenance of plural CRD housings standing closely together adjacent to the CRD housing used for setting the apparatus without changing the setting position of the apparatus.

According to the invention, it is possible to change the region of preventive maintenance to the side of a CRD housing adjacent to the CRD housing used for setting the apparatus opposite to the jet nozzle side, by making use of the movement phenomenon of cavitation bubbles. Therefore, it is possible to expand the region of preventive maintenance in a desired direction by using the movement effect of the cavitation bubbles.

DETAILED DESCRIPTION OF THE PREFERRED EMBODIMENTS

Figure 1:
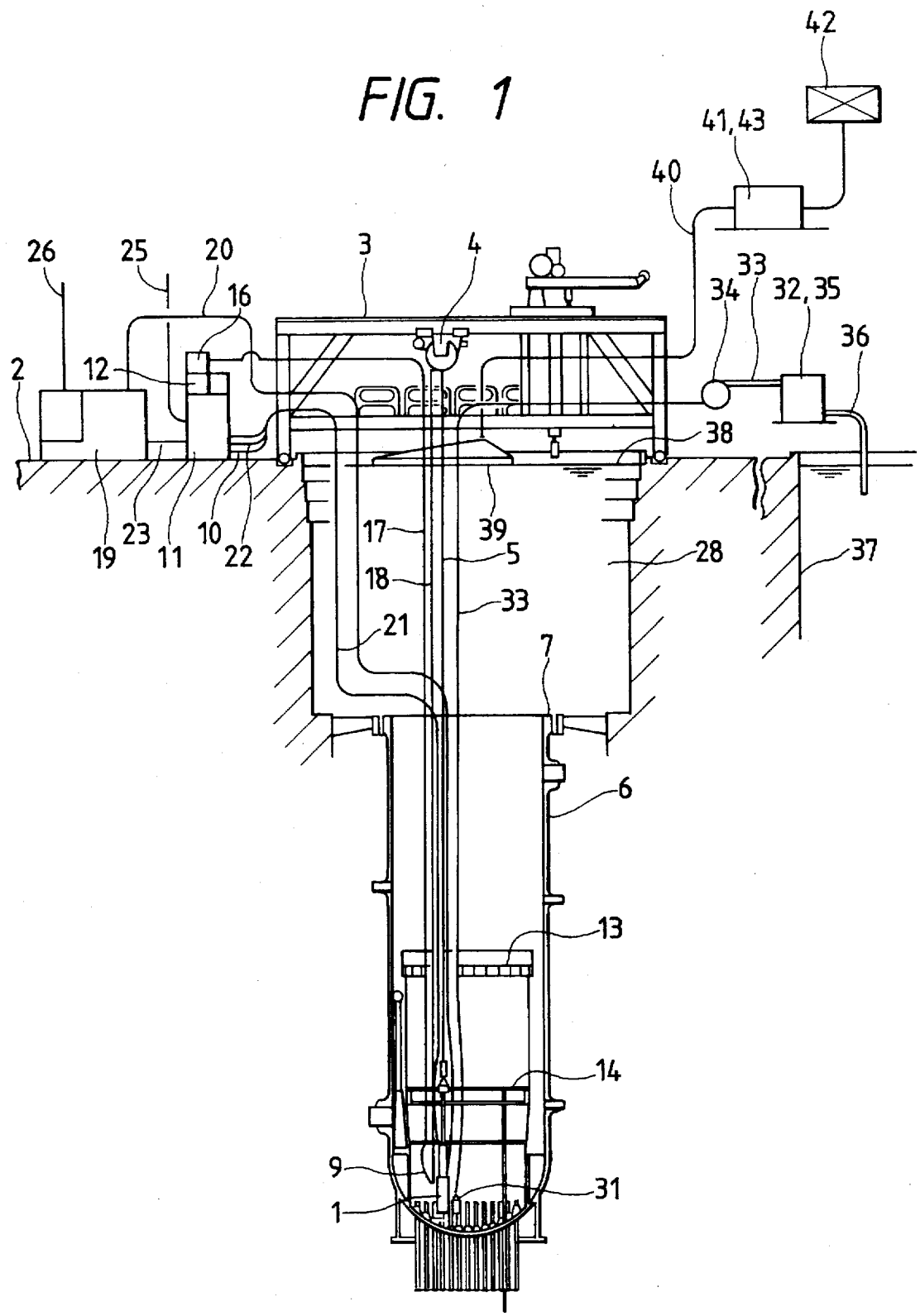
FIG. 1 is an overall diagrammatic view showing an embodiment of an apparatus for preventive maintenance for the bottom portion of a reactor pressure vessel in accordance with the present invention.

FIG. 1 is a view for explaining the structure of an embodiment where the present invention is applied to a nuclear power plant in service.

In performing preventive maintenance, a top head of reactor pressure vessel, a steam dryer assembly, a steam separator assembly, fuel assemblies, control rods, incore monitoring system (ICM), fuel support pieces, control rod drives (CRD), control rod drive guide tubes, which are not shown in the figure, are removed successively.

An apparatus 1 for preventive maintenance is connected to a hoist crane 4 mounted on a refueling platform 3 installed on an operating floor 2 in a reactor building with a wire cable 5. The apparatus 1 is set to a desired position by running and travelling along the refueling platform 3 and by operating the hoist crane up-and down.

Setting the apparatus 1 may be performed using a platform for working, which is not shown in the figure, by setting a base on a flange 7 of a reactor pressure vessel 6, setting a rotating platform rotatable around the center of the reactor pressure vessel 6 as the axis on the base and a moving carriage movable in the radial direction on the rotating platform, and providing a hoist unit for hoisting the apparatus 1 to set a desired position to the moving carriage.

Work for setting the apparatus is performed while pictures of the work are being monitored with a monitoring camera 8 mounted on the apparatus and a monitoring camera 9 separate from the apparatus.

The picture produced by the monitoring camera 8 mounted on the apparatus is projected on a monitor 12 mounted on a control panel 11 through a cable 10, and using the picture the apparatus is lowered so as not to interfere with the core structures by confirming the positional relationship, especially, the gap between the apparatus and the lattice of an upper grid plate 13 and the gap between the apparatus and a hole 15 for a fuel support piece in a core support plate 14.

The picture produced by the monitoring camera 9 separate from the apparatus is projected on a monitor 16 placed beside the control panel 11, and therewith the positional relationship between the apparatus and the reactor internal parts and the hoisting position of the apparatus are confirmed.

An operator performs the moving operation of the monitoring camera 9 on the refueling platform 3 by moving a cable 17 of the monitoring camera 9 and a support cable 18 connected to the front end of the monitoring camera 9.

Figure 8:
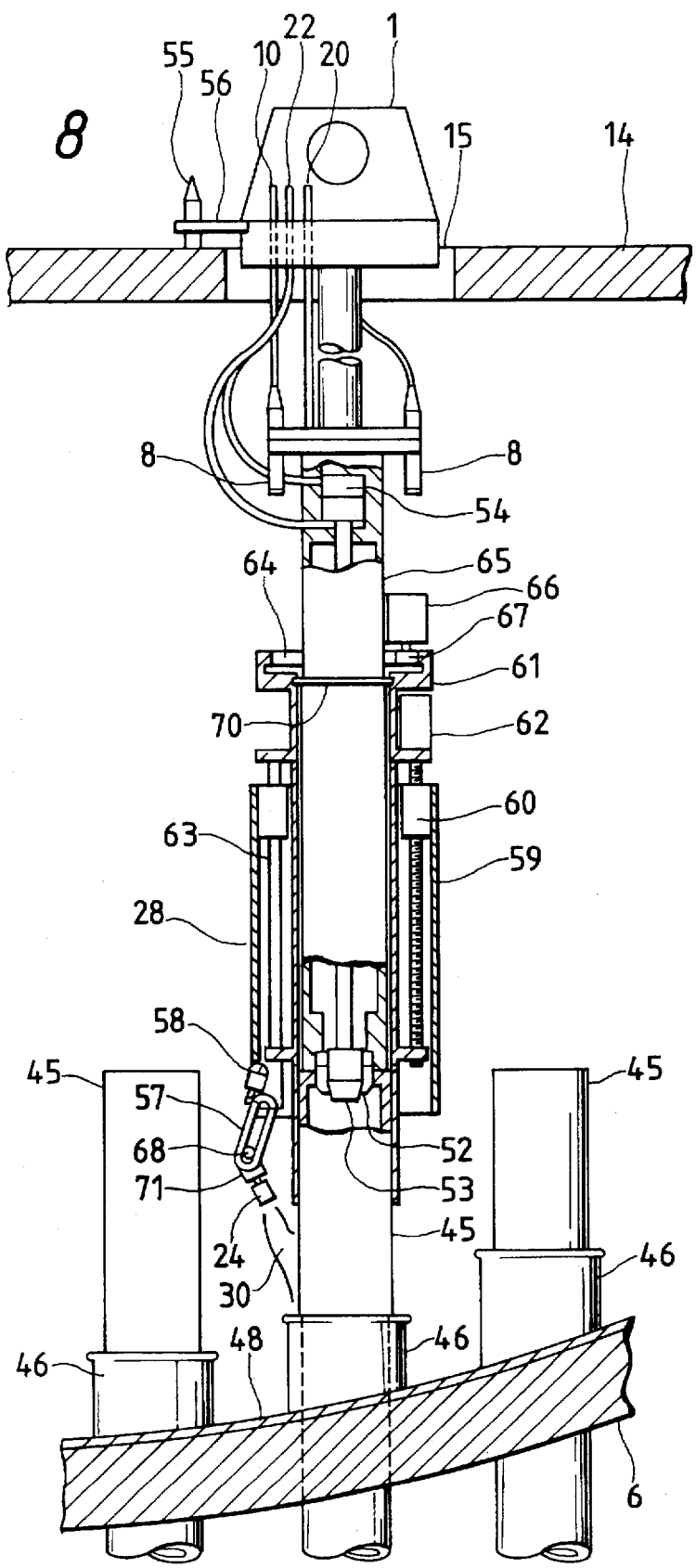
FIG. 8 is an elevational view showing a working state of preventive maintenance for a CRD housing in a setting position of each embodiment of an apparatus for preventive maintenance in accordance with the present invention.

The mounting position of the monitoring camera 8 mounted on the apparatus 1 is shown in FIG. 8.

On the operating floor 2 in the reactor building, there are installed the control panel 11 for remotely controlling the apparatus 1 and a high pressure pump 19 for supply of water of reactor grade with a high pressure.

The high pressure pump 19 may be installed in a loading hatch for a large machine in the reactor building, not shown, or in an unused space in the reactor building instead of the operating floor 2.

In such a case, a high pressure hose 20 is connected between the high pressure pump 19 and the apparatus.

The control panel 11 is connected with a control cable 21 to receive and transmit electric signals for remotely operating the apparatus 1, an air hose 22 to supply air for remotely operating the apparatus 1 and a control cable 23 to receive and transmit electric signals for remotely operating the high pressure pump 19. The control panel 11 remotely controls each of the units.

The remote operation can be performed by selecting a manual mode or automatic mode. The execution is basically performed in an automatic mode, and positional adjustment of the jet nozzle 24 and the like are performed in an automatic mode.

Further, the control panel 11 can adjust various operating speeds and the pitches of up-and-down movement, rotation and swinging of the jet nozzle 24 in optimum conditions at the beginning of execution.

Each of various driving mechanisms will be described below, referring to FIG. 8.

Operating air for remotely operating the apparatus 1 is conducted to the control panel 11 from an air supply source in the reactor building through the air hose 25 to remotely control the apparatus 1 by controlling a valve in the control panel 11.

In regard to the air for remotely operating the apparatus 1, it may be possible to provide a compressor, which is not shown in the figure, separately from the air supply source in the reactor building to supply air to the air hose 25.

In regard to the system to supply high pressure water to the apparatus, water of reactor grade is supplied from a water supply source in or near the reactor building to the high pressure pump 19.

In regard to the water to be supplied to the high pressure pump 19, it may be possible to supply ordinary water, other than the water supply source in or near the reactor building, by purifying it to pure water through a water purifying apparatus, not shown in the figure, for adjusting ordinary water to a water quality which will not cause any problem if it is supplied into the reactor.

Further, it may be possible to supply the reactor water 28 to the high pressure pump 19 using a recirculation pump 27 through a hose 29 and a filter 69 to remove the crud floating in the reactor water.

In this case, a recirculating system is formed, and in the system the reactor water 28 is pumped up with the high pressure pump 19 and then spouted from the jet nozzle 24 and returned again to the reactor. The water pumped up (the water 28 in the case of the recirculating system in FIG. 2) is conducted to the apparatus 1 through a high pressure hose 20, and is spouted from a jet nozzle 24 attached to the apparatus 1 to generate cavitation bubbles 30.

Incidentally, the crud formed of a main component of radioactive oxidized iron, sunken and accumulated in the bottom of the reactor pressure vessel 6, is whirled up by the water flow due to the collapsing pressure of the cavitation bubbles and the high pressure water jet during treatment, which causes difficulty in observation with the monitoring cameras 8, 9 and an increase in the radiation dose emitted to the environment. Therefore, the crud is collected by a crud collector 32 having a suction port 31.

The crud collector 32 is composed of the suction port 31, a crud transfer hose 33 and a crud transfer pump 34, and the crud sucked together with the reactor water 28 is trapped with a filter 35 in the crud collector 32.

The crud free water 28 is returned to a spent fuel storage pool 37.

The trapped crud from the filter 35 is packed in a container, not shown in the figure, such as a drum with shielding and is stored in the nuclear plant as high level radioactive waste.

The bubbles not collapsing and reaching up to the reactor water surface among the cavitation bubbles 30 generated by the high pressure jet enclose the radioactive crud described above, and possibly become a source of radioactive pollution by collapsing on the reactor water surface 38. Therefore, air is collected by a gas collecting cover 39 covering the reactor water surface 38 and is exhausted to an exhausting duct 42 for ventilating and air conditioning existing in the reactor building using a local air exhausting unit 41 through a transfer hose 40.

A filter 43 for trapping dust and mist is installed in the local air exhausting unit 41 to trap radioactively contaminated materials.

The filter 43 having trapped dust and mist is packed in a container, not shown in the figure, such as a drum with shielding and stored in the nuclear plant as radioactive waste.

Decontamination in the reactor pressure vessel 6, prevention of expansion of contamination and a decrease of the radiation dose are attained at the same time by using the crud collector 32 and the local air exhausting unit 41, which are accessory units.

Figure 2:
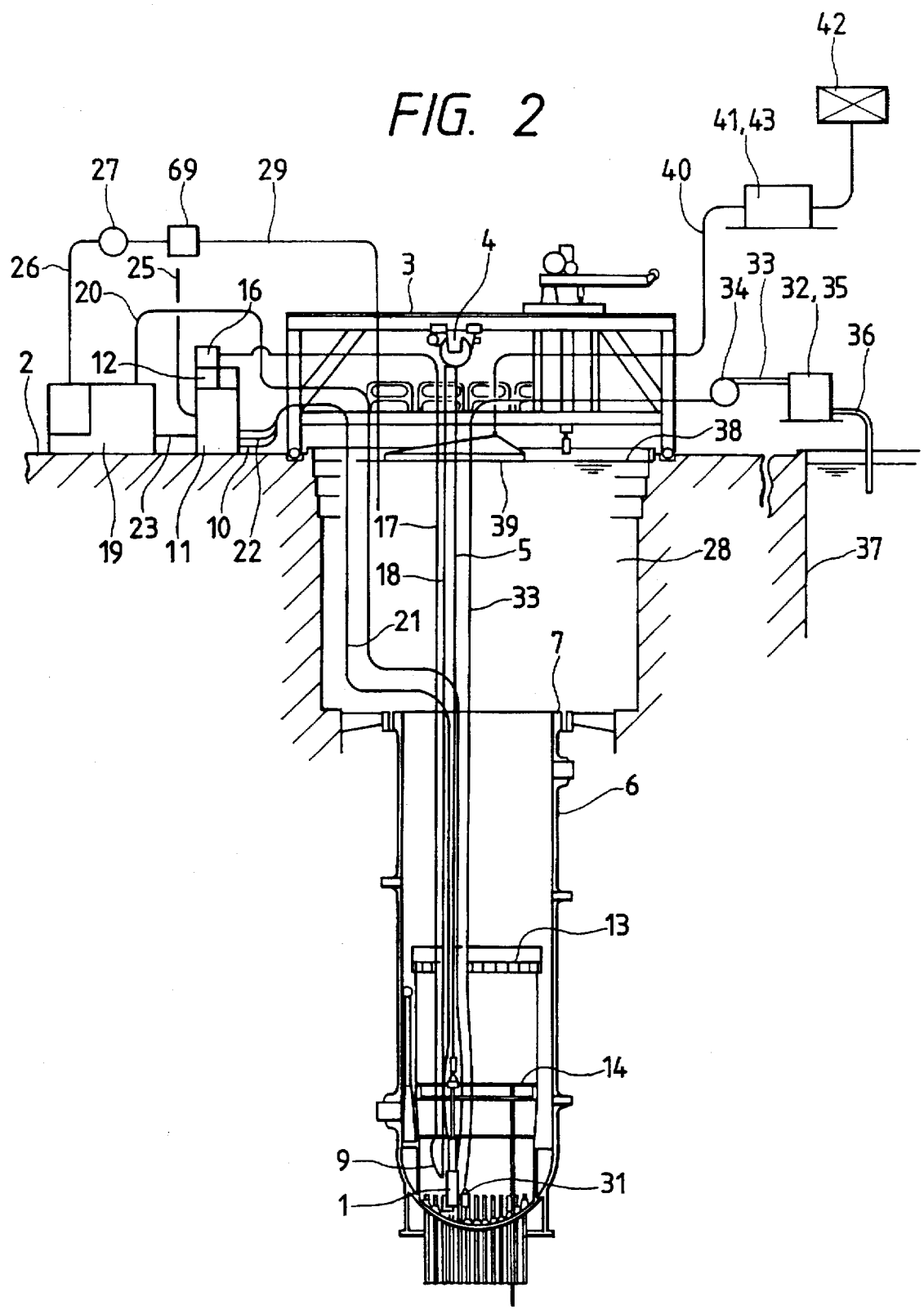
FIG. 2 is an overall diagrammatic view showing another embodiment of an apparatus for preventive maintenance for the bottom portion of a reactor pressure vessel in accordance with the present invention.

FIG. 2 is a view showing the structure of another embodiment of a recirculation system for utilizing the reactor water 28 as a jet stream of water as described above.

This system is the same as the system in FIG. 1 except that a pump 27 is used for supplying the reactor water 28 to the pump 19 through the hose 29.

Figure 3:
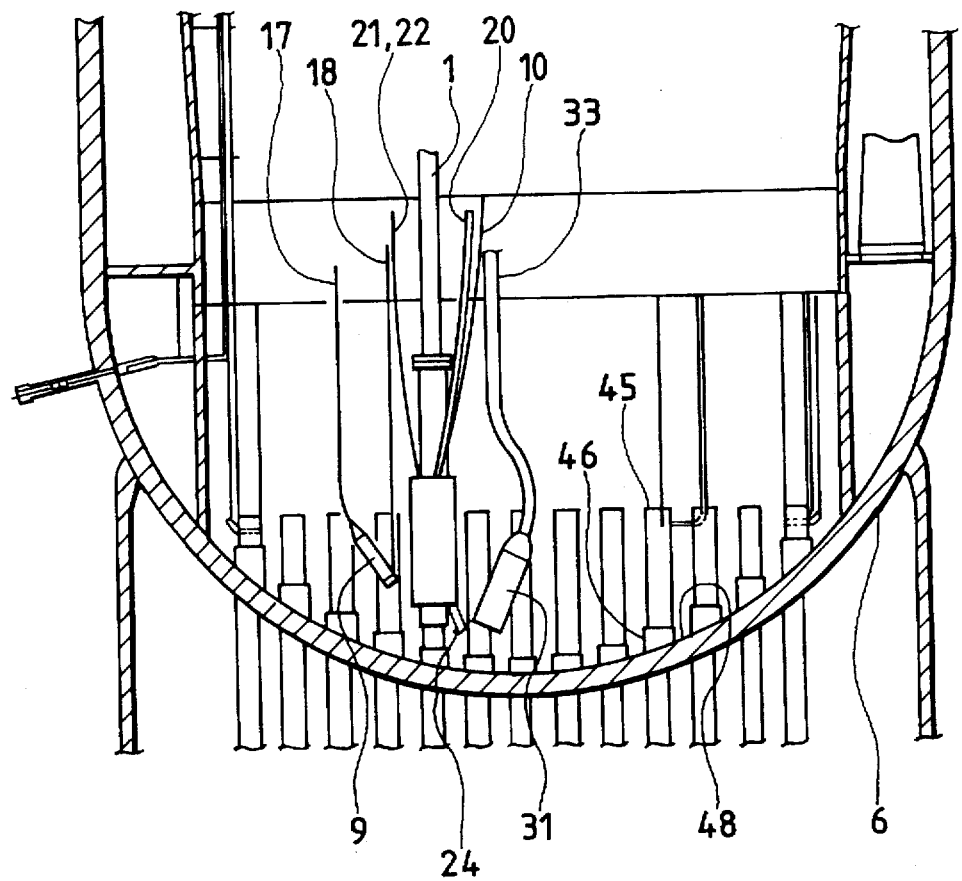
FIG. 3 is a partially enlarged view of a portion of each of the embodiments of the apparatuses for preventive maintenance in accordance with the present invention.

FIG. 3 shows the bottom portion of a reactor pressure vessel 6 and its vicinity which is main portion of the present invention shown in FIG. 1 and FIG. 2 where an apparatus 1 for preventive maintenance is set.

Figure 4:
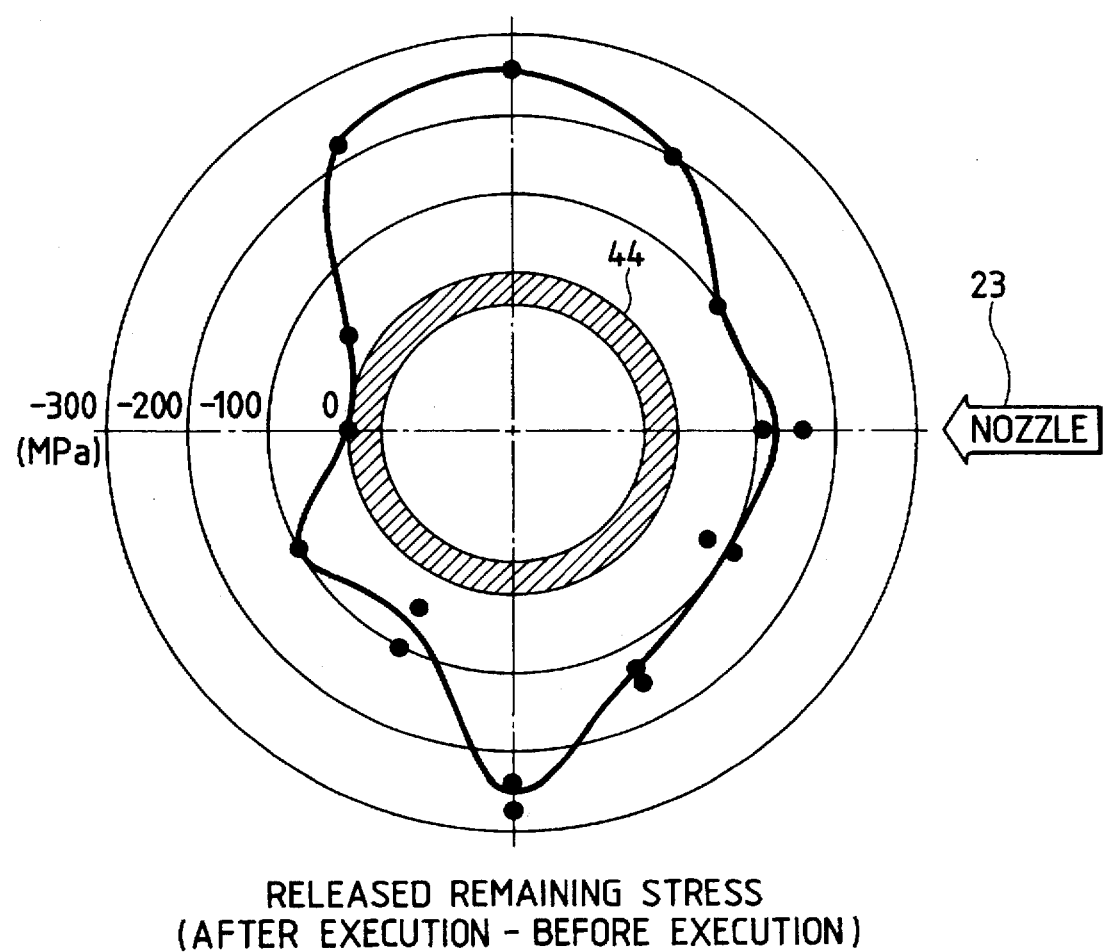
FIG. 4 is a graph showing the movement effect of cavitation jet flow in each of the embodiments of the apparatus for preventive maintenance in accordance with the present invention.

FIG. 4 is an example of data showing the movement effect, in which the cross-sectional shape of an object 44 to be treated, that is, an object for preventive maintenance, is circular or elliptical, and the cavitation bubbles 30 flow downstream along the curved surface thereof.

In this figure, released residual stress (remaining stress after execution—residual stress before execution) is expressed by the axis directed radially from the center of the object 44.

According to this figure, in a case of a single direction (right hand side in the figure) jet flow from the jet nozzle 24, the released residual stress is spread so as to surround the object 44.

According to this movement effect, in order to perform prevention of occurrence of SCC, there is no need to scan the jet nozzle 24 all over the whole periphery of the object having a circular or elliptical cross-sectional shape, such as parts of the treated objects in the present invention including CRD housing 45, CRD stub tube 46 and ICM housing 47.

By doing so, the number of positions to set the apparatus 1 can be decreased by one-half.

Figure 10:
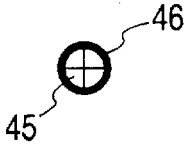
FIG. 10 is a chart showing various executing patterns in an embodiment of the present invention.
Figure 10:
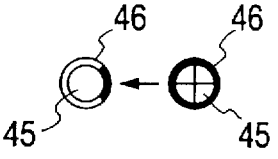
Figure 10:
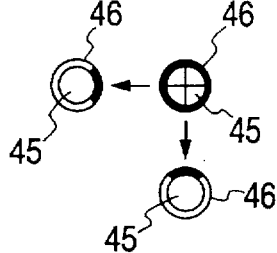
Figure 10:
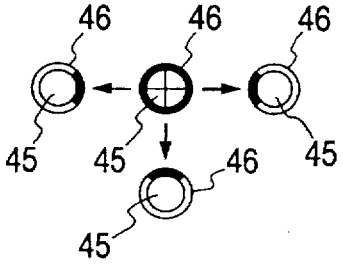
Figure 10:
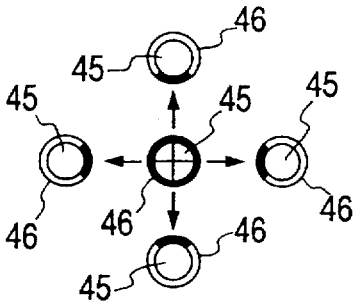
Figure 10:
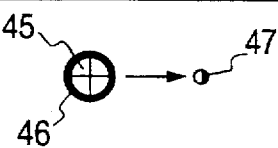

FIG. 10 shows a diagram of execution patterns making use of the movement effect of cavitation bubbles.

The mark + in the diagram of the execution patterns shown in FIG. 10 indicates the position of the CRD housing 45 in which the apparatus 1 is set.

The apparatus 1 firstly performs treatment of the objects in the position of a CRD housing 45 where the apparatus for preventive maintenance itself is set such as the CRD housing 45, the CRD stub tube 46, the bottom portion of the reactor pressure vessel 6 and each of the welded portions and the overlaid portion of the bottom head 48, as shown in No. 1 of FIG. 10.

This is a pattern mainly in a case of executing a place where a CRD housing 45 is individually installed.

In the execution pattern in No. 2 of FIG. 10, the movement effect of the cavitation bubbles 30 is applied to treatment of the objects in the neighborhood of a CRD housing 45 where the apparatus 1 is set, such as the CRD housing 45, the CRD stub tube 46, the bottom portion of the reactor pressure vessel 6 and each of the welded portions and the overlaid portion of the bottom head 48.

Since the movement effect is exerted on 45% of the object to be treated in the neighborhood thereof (solid region in FIG. 10), one setting position of the apparatus 1 can perform the treatment for 1.25 positions as a result.

By doing so, the execution patterns are classified into five kinds in FIG. 10.

In FIG. 10, the mark + indicates the position of the CRD housing 45 in which the apparatus 1 is set, and the solid region indicates the range in which the preventive maintenance work is available.

For the ICM housing 47, one setting position of the apparatus 1 can perform the treatment of 0.5 positions as shown in No. 6.

Figure 5:
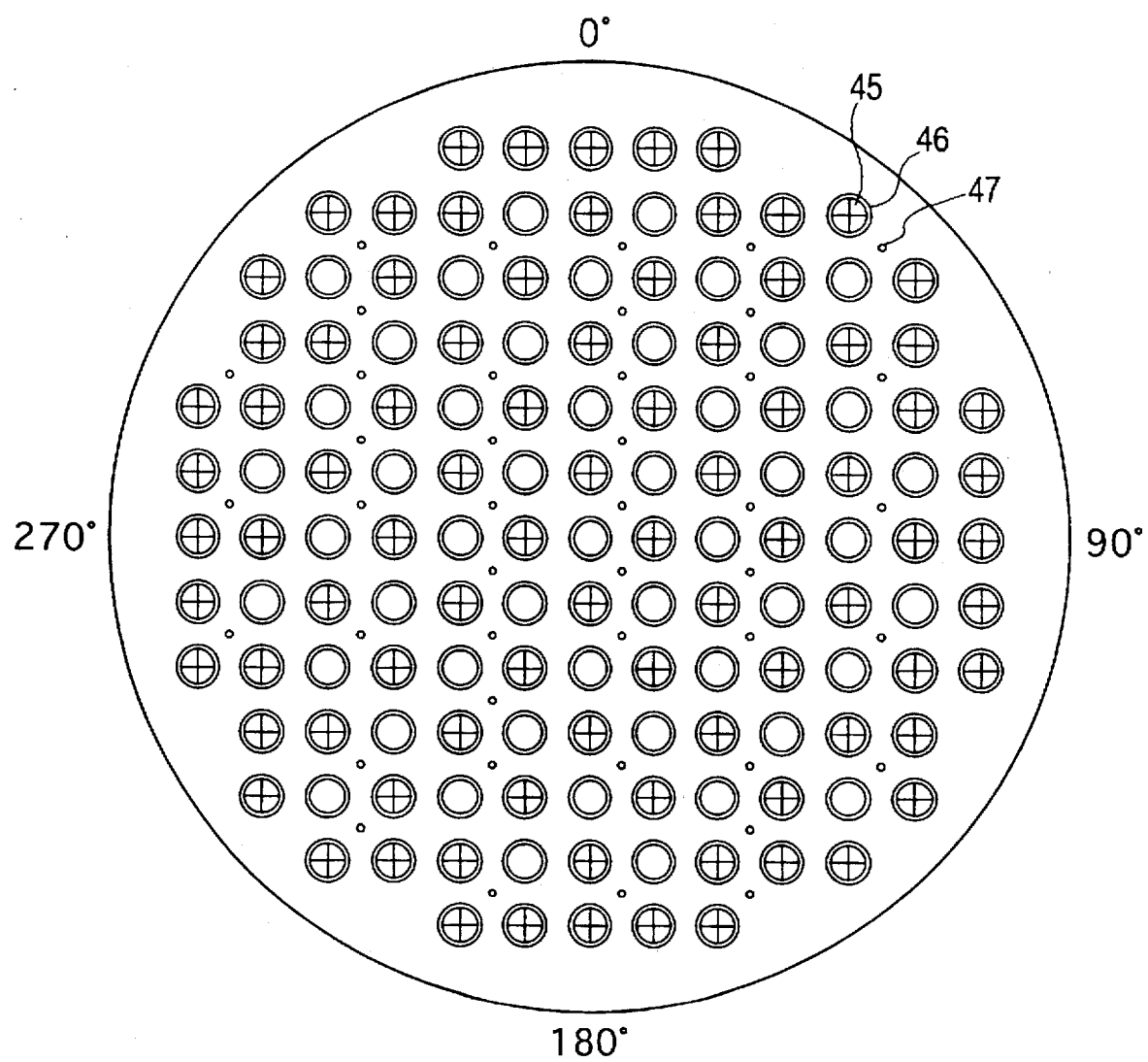
FIG. 5 is a plan view of the bottom inside portion of a reactor pressure vessel showing the position setting of an apparatus for preventive maintenance in the bottom inside portion of a reactor pressure vessel to which the present invention is applied.

FIG. 5 is a plan view of the bottom inside portion of a reactor pressure vessel showing the position setting an apparatus for preventive maintenance in the bottom inside portion of a reactor pressure vessel in accordance with the present invention.

The plant of this example has 137 CRD's and 43 ICM's, and therefore the total number of positions to be treated is 180.

If the execution patterns shown in FIG. 10 are applied to the plant of this example, it is possible to cover all the objects to be executed, that is, the CRD housings 45, the CRD stub tubes 46, the ICM housings 47, the bottom portion of the reactor pressure vessel 6 and each of the welded portions and the overlaid portion of the bottom head of the reactor pressure vessel 6 by setting the apparatus 1 in the 88 positions marked by "+".

Although the number of positions to be treated in the plant of this example is 180, the number varies from 120 up to 240 positions depending on the output capacity of the plant.

If the execution patterns shown in FIG. 10 are applied to the such a plant, the number of positions to be executed can be decreased by one-half and the executing efficiency is improved.

The method of fixing the apparatus 1, the scanning pattern of the jet nozzle 24 and the method of preventive maintenance utilizing cavitation bubbles 30 will be described below, referring to FIG. 8 and FIG. 9.

Figure 6:
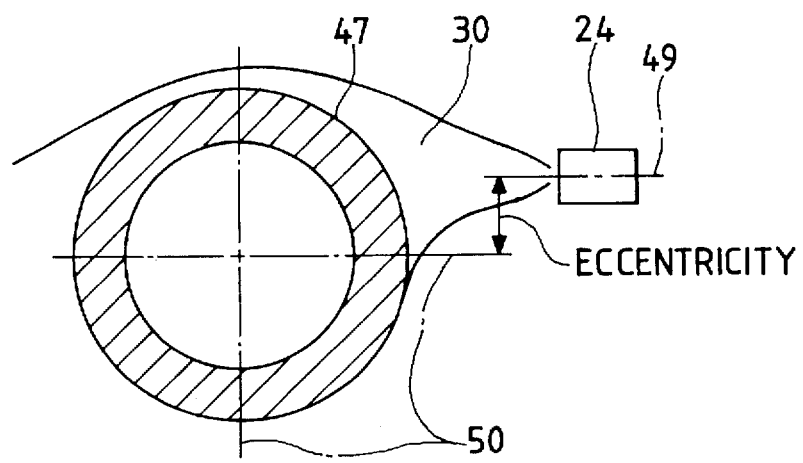
FIG. 6 is a plan view showing the movement feature of cavitation jet flow in each of the embodiments of the present invention in a case where the center of the jet flow from a jet nozzle is eccentric to the center axis of an ICM housing.

FIG. 6 shows an example of changing the movement feature of the cavitation bubbles 30 by making the center of jet flow 49 from the jet nozzle 24 eccentric to the center axis 50 of an ICM housing 47.

According to the figure, by making the center of the jet flow 49 from the jet nozzle 24 eccentric, the cavitation bubbles 30 go around to the back side of an ICM housing 47 to extend the range of treatment with SCC preventive maintenance.

In cases of the CRD stub tube 46 and the CRD housing 45, not shown in the figure, the same effect can be obtained though there is a difference in the degree of movement around the object depending on the difference in its diameter.

Figure 7:
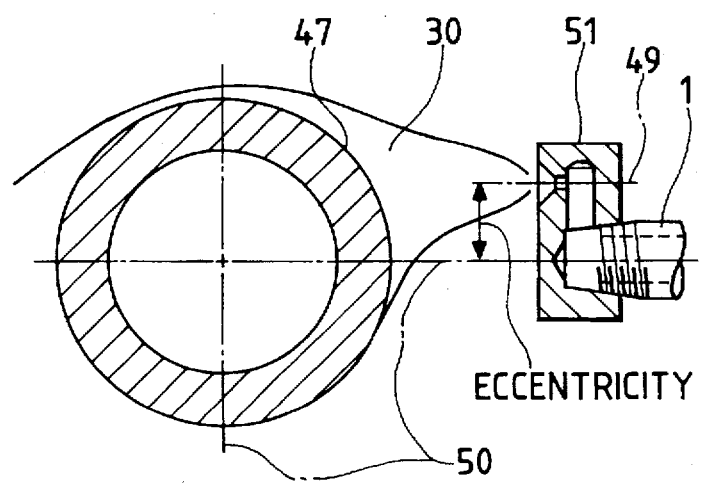
FIG. 7 is a plan view showing the movement feature of cavitation jet flow in each of the embodiments of the present invention in a case where an eccentric jet nozzle is used to make the center of jet flow from a jet nozzle eccentric to the center axis of an ICM housing.

FIG. 7 shows an embodiment to obtain the movement effect by making use of eccentricity. Therein, after executing preventive maintenance for the circular or cylindrical objects (such as the ICM housing, the CRD stub tube, the CRD housing and their welded portions) to be treated with preventive maintenance using the jet nozzle 24, the same objects are treated by exchanging the jet nozzle 24 for an eccentric jet nozzle 51 of which the center of jet flow 49 is eccentric to the center axis of the ICM housing 47.

Therefore, attaching/detaching means using a screw of the jet nozzle is provided in the attaching portion of the jet nozzle to the arm as exchanging means of the jet nozzle.

In the case of this figure, the same as in FIG. 6, the cavitation bubbles 30 go around to the back side (left hand side in FIG. 7) of an ICM housing 47 to extend the range to be treated with SCC preventive maintenance.

In cases of the CRD stub tube 46 and the CRD housing 45, not shown in the figure, the same effect can be obtained though there is a difference in the degree of movement around the object depending on the difference in its diameter.

FIG. 8 shows details of an embodiment of an apparatus for preventive maintenance.

The apparatus for preventive maintenance in this figure is set and fixed to a top end of either of a CRD stub tube 46 or a CRD housing 45 composing the bottom portion of a reactor pressure vessel 6 and a hole 15 for a fuel support piece in a core support plate 14.

The fixing method is performed by inserting a top end 52 for fixing the apparatus 1 into an opening in the head of a CRD housing 45, the top end 52 being a member of spring structure with its base shrinking to a little smaller diameter than that of the opening in the head of the CRD housing 45 in a free state and expanding to a larger diameter in response to a pushing piece 53 having a taper entering into the top end 52 by the action of an air cylinder 54, fixing the apparatus to the opening in the head of the CRD housing 45 by opening the top end 52, and positioning the apparatus with respect to the CRD housing 45 at the same time.

The top end 52 is attached to the bottom inside an inner body 65 as a setting structure body concentrically to the inner body 65.

The upper portion of the apparatus 1 is laterally supported within the hole 15 of the fuel support piece, and is determined as to its position in the rotating direction by matching a cut 56 in the apparatus 1 to a positioning pin 55 on the core support plate 14 to set a position of the jet nozzle 24 at starting time operation.

The air cylinder 54 is set and fixed to the upper portion of the inner body 65, and a piston rod underneath the air cylinder 54 is connected to the pushing piece 53 to make the pushing piece move up-and-down.

The upper portion of the CRD housing 45 is inserted into the lower portion of the inner body 65 to support the apparatus so that it will not fall down.

Outside the inner body 65, an intermediate body 61 of the rotating body is installed rotatably and concentrically with respect to the inner body 61 through a bearing 70.

The intermediate body 61 is driven to be rotated, by a driving motor 66 fixed to the inner body, through gears 67, 64.

Outside the intermediate body 61, an outer body 59 is installed concentrically with respect to the inner body 65.

The outer body 59 is attached to the intermediate body 61 and is slideably up-and-down with a transfer mechanism of the ball screw type.

In the transfer mechanism of the ball screw type, a rotating driving shaft of a traveling motor 62 attached to the intermediate body 61 is jointed to a long vertical screw shaft rotatably attached also to the intermediate body 61, and a nut fixed to the outer body 59 is screwed to the screw shaft to be transferred up and down by the rotating screw shaft driven by the traveling motor 62, and then the outer body 59 fixed to the nut 60 travels upward and downward.

The numeral 63 refers to a guide fixed to the intermediate body 61 to which a guide piece fixed to the outer body 59 is engaged slidably in the vertical direction to guarantee the outer body will travel accurately in the vertical direction without swinging.

An articulated arm is attached to the bottom portion of the outer body 59.

One end of the articulated arm 57 is rotatably attached to the outer body 59, and the other end of the articulated arm 57 is swingably attached to another arm 57 and driven by a swinging motor 68. The arm 57 and the outer body 59 are jointed with a cylinder 58 so that the arm 57 can be swung by expanding and contracting operation of the cylinder 58. Further, a screw matching with the screw provided for each of the jet nozzles described above is provided in the other end of the arm 71 so that each of the jet nozzles may be attached to the arm.

The driving mechanism of the jet nozzle 24 will be described below.

The jet nozzle 24 can be moved upward and downward and rotated to the CRD housing 45 to which the apparatus 1 is set, and the jet nozzle 24 can be swung so as to change the direction of the jet.

Further, the arm 57 for the jet nozzle can be raised and lowered with the cylinder 58 so that the jet nozzle 24 does not interfere with other components inside the reactor when the apparatus 1 is lowered to the bottom portion of the reactor pressure vessel 6.

Although, in this figure, the piston of the cylinder 58 is projected and withdrawn by raising and lowering of the link mechanism of the arm 57 the jet nozzle, the arm 57 for the jet nozzle may be raised and lowered by transmitting rotation of a motor through a gear.

Traveling of the jet nozzle 24 is performed by rotating the ball screw 60 attached to the inside of the inner body 59 of the apparatus 1 using the travelling motor 62 attached in the intermediate body 61 of the apparatus 1.

The outer body 59 smoothly and accurately travels upward and downward, being guided by the guide 63 attached to the intermediate body 61.

Rotating operation of the jet nozzle 24 to the CRD housing 45 is performed by rotating a gear 64 of a part of the apparatus 1 using a gear 67 of the rotating motor 66 attached to the inner body 65 of the apparatus 1.

The intermediate body 61 is vertically supported by a bearing 70 for bearing the thrust load installed in the inner body 65 so that it may be smoothly rotated.

Swinging operation of the jet nozzle 24 is performed by attaching the swinging motor 68 to the end of the arm 57 for the jet nozzle, fixing the rotating shaft of the swinging motor 68 to the jet nozzle swinging arm 71 attached to the jet nozzle 24, and rotating the swinging motor 68 in the normal direction and the reverse direction.

A detector for detecting the rotating position and the rotating speed, such as a potentiometer, is provided for each of the traveling motor 62, the rotating motor 66 and the swinging motor 68 for driving the jet nozzle 24 to move upward and downward, to rotate and to swing, and the signals are transmitted to the control panel 11 through the control cable 21 to control rotation of each of the motors such that the scanning speed and the jet position (traveling position, rotating position, swing angle) of the jet nozzle are controlled an optimum condition.

The water pumped with the high pressure pump 19 is conducted to the apparatus 1 through the high pressure hose 20 and spouted from the jet nozzle 24.

Therewith, cavitation bubbles 30 are generated by the pressure difference and the shearing between the surrounding water (reactor water) 28 and the jet flow, and the condition of residual stress is improved by opening the whole of the bottom portion of the reactor pressure vessel 6 with impulsive pressure generated at the time when the cavitation bubbles 30 are collapse on or near the surface of the bottom portion of the reactor pressure vessel 6.

The scanning pattern of the jet nozzle 24 is set so as to set the relation of the welded portion of the CRD stub tube 46 located beneath the CRD housing 45 to the apparatus 1 and the bottom portion of the reactor pressure vessel 6 by address management in the control panel 11 in advance, and the apparatus 1 repeats up-and-down moving operations in the axial direction with an optimum executing speed and a rotating operation in the peripheral direction with an optimum pitch to the CRD housing 45 to which the apparatus is set while adapting to the shape the welded portion for each of the addresses.

In the lowest end position of up-and-down movement the jet nozzle 24 is made to swing so that the cavitation bubbles 30 are blown up to the overlaid portion of the bottom head 48 so as to expand the region affected by the preventive maintenance effect.

With the scanning pattern described above, the preventive maintenance for SCC is performed on the objects to be treated such as the CRD housing 45, the CRD stub tube 46, the bottom portion of the reactor pressure vessel 6 and their welded portions and the overlaid portion of the bottom head 48.

Figure 9:
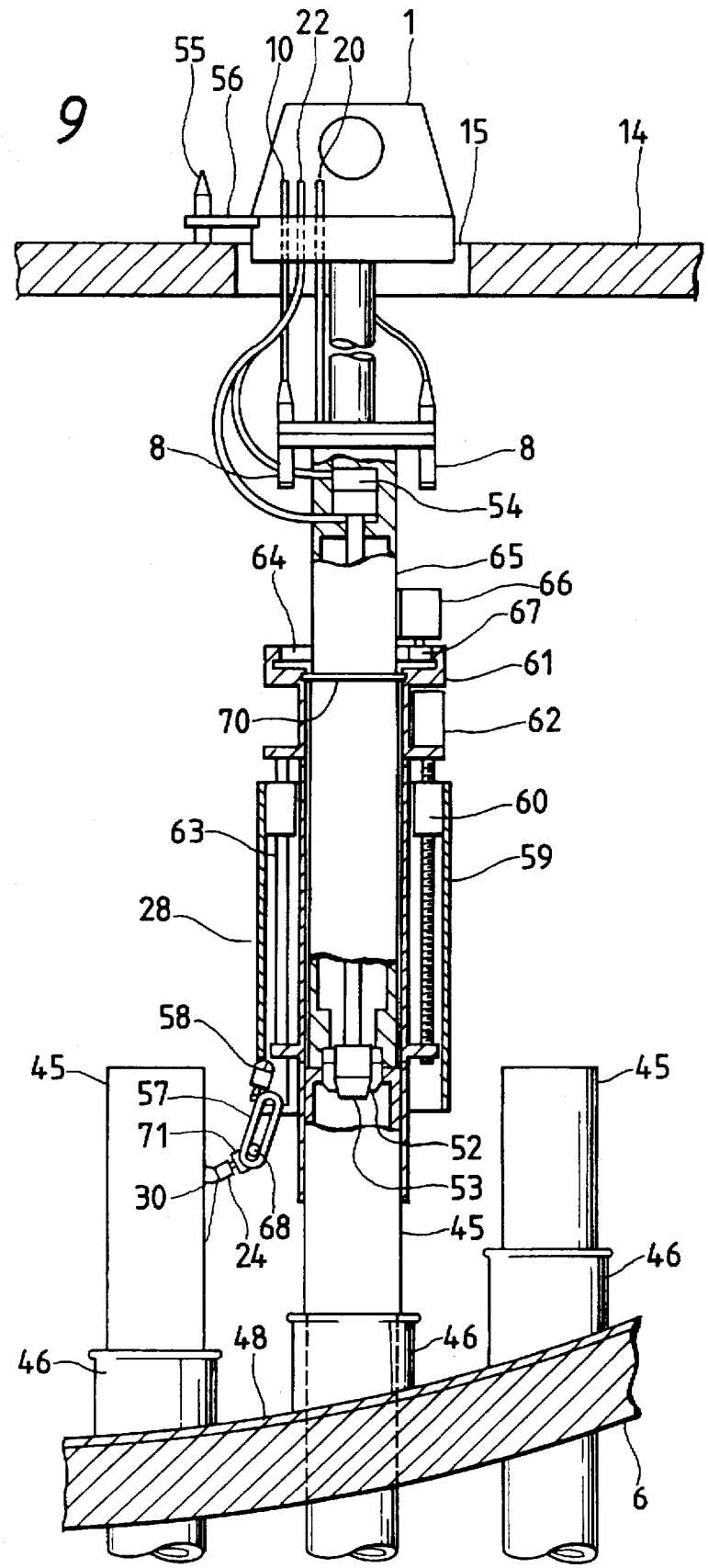
FIG. 9 is an elevational view showing a working state of preventive maintenance for a CRD housing near a setting position of each embodiment of an apparatus for preventive maintenance in accordance with the present invention.

FIG. 9 shows a state where the jet nozzle 24 is directed outward by swinging the articulated arm.

The fixing method of the apparatus 1, the driving mechanism of the jet nozzle 24, the scanning pattern of the jet nozzle 24 and the method of preventive maintenance by use of cavitation bubbles are the same as described in connection with FIG. 8.

The jet nozzle 24 is swung by rotating the swinging motor 68 at an optimum angle for each of the portions to be treated outside the CRD housing for each address to which the apparatus for preventive maintenance is set, and further, the jet nozzle 24 spouts high pressure water while the jet nozzle is raised and lowered with an optimum moving speed and rotated in the peripheral direction with an optimum pitch. Preventive maintenance is performed on the CRD housings, the CRD stub tubes 46, the bottom portion of the reactor pressure vessel 6 and their welded portions and the overlaid portion of the bottom head 48 around the CRD housing 45 to which the apparatus 1 is set. Therein, the region affected by the preventive maintenance in each of the executed portions is expanded by the movement effect of cavitation bubbles 30.

According to the present invention, cavitation bubbles 30 are generated by attaching an apparatus 1 for preventive maintenance, having a driving mechanism for a jet nozzle 24, to a CRD housing 45 and spouting high pressure water from the jet nozzle 24. The jet nozzle 24 is directed toward and away from the CRD housing 45 and the cavitation bubbles 30 impacts against the CRD stub tube 46, the CRD housing 45, the ICM housing 47 and their welded portions and the overlaid portion of the bottom head 48, which compose the pressure boundary of the bottom portion of the reactor pressure vessel 6, while the jet nozzle 24 is rotated, moved upward and downward, and swung. The stress condition in the whole bottom portion of the reactor pressure vessel 6 can be improved on the compressive condition side by opening with impulsive pressure produced at the time when the cavitation bubbles collapse to decrease the potential of an occurrence of stress corrosion crack (SCC).

Decontamination in the reactor pressure vessel 6, prevention of expansion of contamination and decrease of the radiation dose are attained at the same time by using the crud collector 32 and the local air exhausting unit 41, which are accessory units in accordance with the present invention.

By making use of the movement effect of cavitation bubbles to execute preventive maintenance of the object 44 having a circular or elliptical cross-sectional shape, such as provided by each of the housings, the number of settings of the apparatus 1 to a CRD housing 45 can be decreased and, therefore, the effect of the treatment can be improved.

By making the center of the jet 49 of the jet nozzle 24 eccentric with respect to the center axis 50 of the ICM housing 47, the cavitation bubbles 30 go around to the reverse side of the ICM housing 47 and the region to be treated with preventive maintenance for SCC can be expanded, and, therefore, the effect of the treatment can be improved.

By exchanging the jet nozzle for an eccentric jet nozzle 51 in order to make the center of the jet flow eccentric with respect to the center axis of the ICM housing 47 in advance, the cavitation bubbles 30 go around to the reverse side of the ICM housing 47 and the region to be treated with preventive maintenance for SCC can be expanded, and, therefore, the effect of the treatment can be improved.

What is claimed is:

1. An apparatus for performing preventive maintenance on a bottom portion of a reactor pressure vessel under water to improve a stress condition in an internal structure in said reactor pressure vessel by directing a high pressure jet accompanying generation of cavitation bubbles from a jet nozzle toward the internal structure of the reactor pressure vessel under water, which comprises:

a fixed structural body fixed to a CRD housing in said reactor pressure vessel, and a rotating body mounted on said fixed structural body so as to be capable of rotating in the horizontal plane; and an articulated arm mounted on said rotating body so as to be capable of swinging in a plane having an angle with the rotating plane of said rotating body;

said jet nozzle being supported by said articulated arm.

2. An apparatus for performing preventive maintenance on the bottom portion of a reactor pressure vessel according to claim 1, wherein:

said jet nozzle is mounted on the articulated arm in such a position that the center of said high pressure jet of said jet nozzle is eccentric with respect to the center of the CRD housing.

3. An apparatus for performing preventive maintenance on the bottom portion of a reactor pressure vessel according to claim 2, wherein:

said jet nozzle is an eccentric nozzle in which the position of mounting thereof on the articulated arm and the center of the high pressure jet of said jet nozzle are eccentric in the horizontal direction.

4. An apparatus for performing preventive maintenance on the bottom portion of a reactor pressure vessel according to claim 1, wherein:

said articulated arm comprises means for exchangeably mounting a jet nozzle having the center of its jet eccentric to the CPD housing and a jet nozzle having the center of its jet not eccentric to the CRD housing.

5. An apparatus for performing preventive maintenance on the bottom portion of a reactor pressure vessel according to any one of claim 1 to claim 4, wherein:

said rotating body supports the articulated arm with the capability of moving upward and downward.

6. An apparatus for performing preventive maintenance on the bottom portion of a reactor pressure vessel according to any one of claim 1 to claim 4, which further comprises:

a member engaged with a positioning pin secured and supported to a core support plate.

7. An apparatus for performing preventive maintenance on the bottom portion of a reactor pressure vessel according to any one of claim 1 to claim 4, which further comprises:

a monitoring camera for observing an object to be treated with preventive maintenance.

8. An apparatus for performing preventive maintenance on the bottom portion of a reactor pressure vessel according to any one of claim 1 to claim 4, wherein:

a suction port of a sucking unit installed outside the reactor pressure vessel is provided near an object to be treated with preventive maintenance.

9. An apparatus for performing preventive maintenance on the bottom portion of a reactor pressure vessel according to any one of claim 1 to claim 4, wherein:

a gas collecting cover communicating with an exhausting duct installed outside the reactor pressure vessel is provided near the water surface of water in the reactor pressure vessel.

10. A method of performing preventive maintenance on a bottom portion of a reactor pressure vessel to improve a stress condition in an object to be treated with preventive maintenance by colliding cavitation bubbles generated by water spouting from a jet nozzle, provided in an apparatus for performing the preventive maintenance installed in said reactor pressure vessel, toward the object to be treated with preventive maintenance, comprising the steps of:

while reactor water remains in said reactor pressure vessel, engaging the apparatus for performing preventive maintenance with a core support plate and a CRD housing in said reactor pressure vessel so as to be fixed in said reactor pressure vessel;

spouting water from the jet nozzle mounted on said apparatus for performing preventive maintenance so as to generate cavitation bubbles which collide with said CRD housing and other CRD housings around said CRD housing; and changing the posture of said jet nozzle by moving the position thereof in three dimensional directions so that the cavitation bubbles collide with another desired portion of said reactor pressure vessel to be treated with preventive maintenance.

11. A method of performing preventive maintenance on the bottom portion of a reactor pressure vessel according to claim 10, wherein:

the region of an object to be treated with preventive maintenance is changed through changing of the effect of movement of the cavitation bubbles around the object by making the center of the jet of the jet nozzle eccentric with respect to the center of the CRD housing.

12. A method of performing preventive maintenance on the bottom portion of a reactor pressure vessel according to claim 10, wherein the apparatus for performing preventive maintenance includes a fixed structural body fixed to the CRD housing in said reactor pressure vessel, a rotating body mounted on said fixed structural body so as to be capable of rotating in the horizontal plane, and an articulated arm mounted on said rotating body so as to be capable of swinging in a plane having an angle with the rotating plane of said rotating body, the jet nozzle being supported by said articulated arm.

13. An apparatus for performing preventive maintenance on a bottom portion of a reactor pressure vessel to improve a stress condition in an object to be treated with preventive maintenance by colliding cavitation bubbles generated by water spouting from a jet nozzle, provided in the apparatus for performing the preventing maintenance installed in said reactor pressure vessel, for the object to be treated with preventive maintenance, comprising:

means for engaging the apparatus for performing preventive maintenance with a core support plate and a CRD housing in said reactor pressure vessel so as to be fixed in said reactor pressure vessel while water remains in said reactor pressure vessel;

means for spouting water from the jet nozzle mounted on said apparatus for performing preventive maintenance so as to generate cavitation bubbles which collide with said CRD housing and other CRD housings around said CRD housing; and means for changing the posture of said jet nozzle by moving the position thereof in three-dimensional directions so that the cavitation bubbles collide with another desired portion of said reactor pressure vessel to be treated with preventive maintenance.

14. An apparatus for performing preventive maintenance on the bottom portion of a reactor pressure vessel according to claim 13, further including a fixed structural body fixed to said CRD housing, and a rotating body mounted on said fixed structural body so as to be capable of rotating in the horizontal plane; said means for changing the posture of said jet nozzle including an articulated arm mounted on said rotating body so as to be capable of swinging in a plane having an angle with the rotating plane of said rotating body, said jet nozzle being supported by said articulated arm.

* * * * *